United States Patent Office.

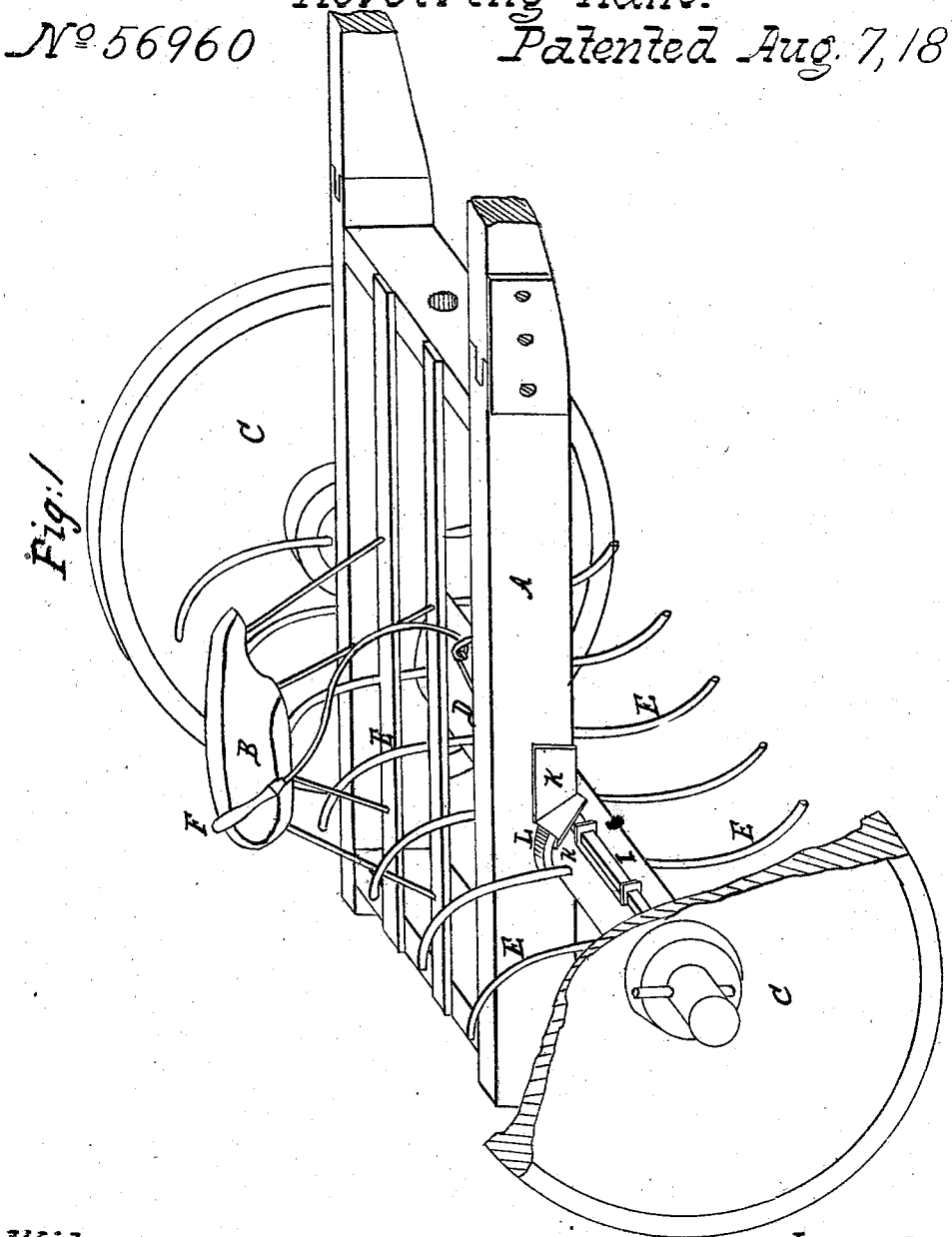

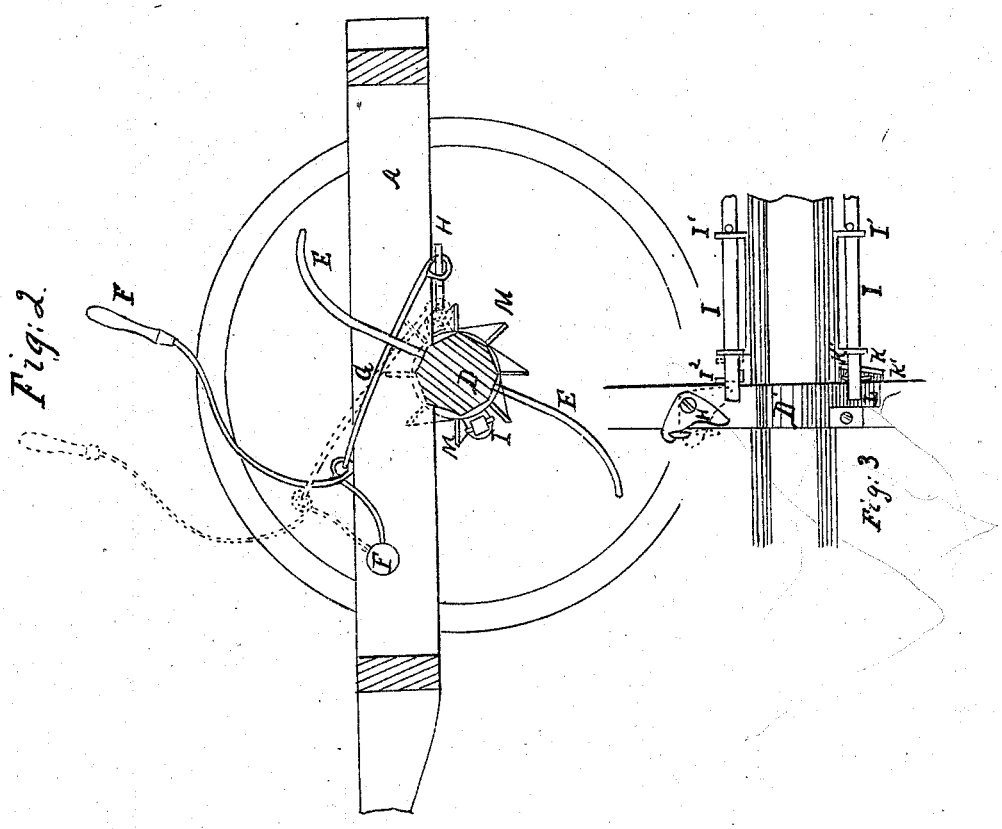

P. LUGENBELL AND T. BARNS, OF GREENSBURG, INDIANA.

IMPROVEMENT IN HORSE-RAKES.

Specification forming part of Letters Patent No. 56,960, dated August 7, 1866.

*To all whom it may concern:*

Be it known that we, PETER LUGENBELL and TURNER BARNS, of Greensburg, in the couny of Decatur and State of Indiana, have invented a new and useful Improvement in Hay-Rakes; and we do hereby declare that the following is a full, clear, and exact description of the same, reference being had to the annexed drawings, made part of this specification, in which—

Figure 1 is a perspective view. Fig. 2 is a vertical longitudinal section. Fig. 3 is a bottom view, showing part of the mechanism.

In the different figures the same letters refer to identical parts.

A is the main frame, to which the horse is attached. This frame sustains the driver riding upon a seat, B, and is supported upon the axle D, on the spindles of which revolve the wheels C. The axle D is attached to the frame A, passing through boxes D′, in which it turns freely when required. The curved teeth of the rake E are fixed in the axle on opposite sides.

To each side of the axle, at the base of the teeth, are attached two bars, I, which, passing through eyes I′, are afforded a reciprocating motion lengthwise.

M M are projecting wings on the inside of the wheel, secured to the wheel or hub. When the bars I are projected between the wings, the wheel and axle being thus united rigidly, the axle revolves with the wheel, turning within its boxes D′. When, on the other hand, the bars I are projected in the opposite direction, so as to rest their inner ends under the main frame A, the axle is made rigid, the wheels turning freely on the spindles.

On the side of the frame is attached the guard K, placed in front of the axle, and having a flange, K′, projecting downward and set diagonally to the line of draft, as shown.

A pin, $I^2$, near the inner end of the bars I, projects in such manner that, with the revolution of the axle, the flange K′, striking against the side of the pin $I^2$, shall draw the bar I toward the main frame, which is cut away with a beveled groove, (shown at L,) to permit this motion of the bar. When the bar I has been thus moved it will catch against the bottom of the frame A after the axle has made a half-revolution. The bars should be so placed that the revolution of the axle, and with it the rake-teeth, shall be checked when said teeth are in proper position to gather the hay.

F is a lever actuated by hand, pivoted at F′, and operating the rod G and bell-crank H. The latter is pivoted on the bottom of the main frame in such position that by the movement of the lever the bolts I will be pushed away from the main frame and between the wings M on the hub. The wheel and axle being thus rigidly united the axle revolves, allowing the teeth to turn up and pass over the hay that has accumulated with the movement forward of the machine. At the same time the opposite teeth are turned down the flange, acting as described, throws the opposite bar under the frame, and again checks the revolution of the axle and teeth until again disengaged by the action of the lever.

Having fully explained the construction and operation of our improved hay-rake, what we claim as our invention, and seek to secure by Letters Patent, is—

1. A horse-rake for gathering hay, &c., when constructed with wheels C C and a revolving axle, D, and two or more rows of teeth, E E, attached thereto, and having also reciprocating bars I I, corresponding in number with the rows of teeth, for checking the revolution of the axle and teeth as they are successively brought into action, substantially as set forth.

2. In combination with the bars I, attached to the axle, the wings M, attached to the wheel, and the guide K, with the flange K′, for alternately checking and permitting the revolution of the axle and teeth, substantially in the manner set forth.

3. In combination with the bars I, the lever F, and bell-crank H, arranged substantially in the manner and for the purpose set forth.

In testimony whereof we have signed our names to this specification in the presence of two subscribing witnesses.

PETER LUGENBELL.
TURNER BARNS.

Witnesses:
J. L. WOODEN,
GEO. CARSON.